(12) United States Patent
Hirabayashi et al.

(10) Patent No.: US 11,141,936 B2
(45) Date of Patent: Oct. 12, 2021

(54) FIBER WIDTH ADJUSTING APPARATUS, FIBER WIDTH ADJUSTING METHOD, AND COMPOSITE FORMING METHOD

(71) Applicant: SUBARU CORPORATION, Tokyo (JP)

(72) Inventors: Daisuke Hirabayashi, Tokyo (JP); Tamotsu Osada, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 206 days.

(21) Appl. No.: 16/241,790

(22) Filed: Jan. 7, 2019

(65) Prior Publication Data

US 2019/0283343 A1    Sep. 19, 2019

(30) Foreign Application Priority Data

Mar. 13, 2018 (JP) .............................. JP2018-045370

(51) Int. Cl.
  *B29C 70/38* (2006.01)
  *B29B 13/02* (2006.01)
  (Continued)

(52) U.S. Cl.
  CPC ............ *B29C 70/388* (2013.01); *B29B 13/02* (2013.01); *B29B 15/08* (2013.01); *B29C 53/18* (2013.01); *B29C 70/443* (2013.01); *B65H 51/04* (2013.01)

(58) Field of Classification Search
  CPC ..... B29C 70/388; B29C 53/18; B29C 70/443; B29C 70/386; B29B 13/02; B29B 15/08; B65H 51/04
  See application file for complete search history.

(56) References Cited

U.S. PATENT DOCUMENTS

2006/0073311 A1   4/2006   Hogg
2008/0020193 A1   1/2008   Jang et al.
(Continued)

FOREIGN PATENT DOCUMENTS

EP   0 602 618 A1   6/1994
EP   1 090 738 A1   4/2001
(Continued)

OTHER PUBLICATIONS

Tanoglu et al., "Effects of thermoplastic preforming binder on the properties of S2-glass fabric reinforced epoxy composites", International Journal of Adhesion and Adhesives, vol. 21, Issue 3, 2001, pp. 187-195. (Year: 2001).*

(Continued)

*Primary Examiner* — Michael N Orlando
*Assistant Examiner* — Christopher W Raimund
(74) *Attorney, Agent, or Firm* — McGinn I.P. Law Group, PLLC.

(57) ABSTRACT

A fiber width adjusting apparatus includes a rotary body. The rotary body is configured to rotate around a rotation axis while interposing a sheet-shaped fiber, and cause, by frictional force generated between the rotary body and the sheet-shaped fiber, force to act on the sheet-shaped fiber while feeding the sheet-shaped fiber in a feed direction to vary a width and an orientation angle of the sheet-shaped fiber. The sheet-shaped fiber is impregnated with a resin or is before the impregnation with the resin. The rotation axis is parallel to a thickness direction of the sheet-shaped fiber. The force contains a component that is in a direction perpendicular to the thickness direction and to the feed direction.

17 Claims, 9 Drawing Sheets

(51) Int. Cl.
*B29B 15/08* (2006.01)
*B29C 70/44* (2006.01)
*B29C 53/18* (2006.01)
*B65H 51/04* (2006.01)

(56) References Cited

U.S. PATENT DOCUMENTS

2009/0071597 A1* 3/2009 Benson ................ B29C 70/388
156/196
2012/0135227 A1 5/2012 Kawabe

FOREIGN PATENT DOCUMENTS

| EP | 1 201 175 A1 | 5/2002 |
| EP | 3 124 661 A1 | 2/2017 |
| WO | WO 83/02085 | 6/1983 |
| WO | WO 2010/137525 A1 | 12/2010 |

OTHER PUBLICATIONS

Extended European Search Report dated Aug. 27, 2019 for European Patent Application No. 19153769.5-1019.

* cited by examiner

FIBER WIDTH ADJUSTING APPARATUS, FIBER WIDTH ADJUSTING METHOD, AND COMPOSITE FORMING METHOD

CROSS-REFERENCE TO RELATED APPLICATIONS

The present application claims priority from Japanese Patent Application No. 2018-045370 filed on Mar. 13, 2018, the entire contents of which are hereby incorporated by reference.

BACKGROUND

Some implementations of the technology relate to a fiber width adjusting apparatus, a fiber width adjusting method, and a composite forming method.

A fiber reinforced plastic (FRP), also referred to as a composite, is a material containing a resin and fibers that reinforce the resin. Non-limiting examples of the composite may include a glass fiber reinforced plastic (GFRP) and a carbon fiber reinforced plastic (CFRP). The composite is manufactured through curing, by heating, a thermosetting resin impregnated into fibers.

One method of manufacturing the composite involves stacking prepregs, shaping the stacked prepregs, and curing a stack of the shaped prepregs by heating. The prepreg is a sheet-shaped material in which an uncured thermosetting resin is impregnated into fibers. Another method is a resin transfer molding (RTM) that involves stacking sheet-shaped fibers that have not been impregnated with a thermosetting resin, shaping the stacked sheet-shaped fibers, impregnating a stack of the sheet-shaped fibers with the thermosetting resin, and curing, by heating, the stack impregnated with the thermosetting resin. The RTM that includes vacuuming to impregnate the resin into the fibers is typically referred to as a vacuum-assisted resin transfer molding (VaRTM). The RTM that utilizes a die to impregnate the resin is typically referred to as matched-die RTM.

Manufacturing the composite by the RTM requires, as a material, a sheet-shaped fiber having an appropriate width and an appropriate thickness. To manufacture such a sheet-shaped fiber, a technique is known that widens a bundle of reinforcement fibers, such as a bundle of carbon fibers or glass fibers, thinly and uniformly. For example, reference is made to International Publication No. 2010-137525.

SUMMARY

An aspect of the technology provides a fiber width adjusting apparatus that includes a rotary body configured to rotate around a rotation axis while interposing a sheet-shaped fiber, and cause, by frictional force generated between the rotary body and the sheet-shaped fiber, force to act on the sheet-shaped fiber while feeding the sheet-shaped fiber in a feed direction to vary a width and an orientation angle of the sheet-shaped fiber. The sheet-shaped fiber is impregnated with a resin or is before the impregnation with the resin. The rotation axis is parallel to a thickness direction of the sheet-shaped fiber. The force contains a component that is in a direction perpendicular to the thickness direction and to the feed direction.

An aspect of the technology provides a fiber width adjusting method that includes manufacturing, with the fiber width adjusting apparatus according to any implementation of the technology, the sheet-shaped fiber in which the width and the orientation angle are varied.

An aspect of the technology provides a fiber width adjusting method that includes: interposing, with a rotary body, a sheet-shaped fiber that is impregnated with a resin or before the impregnation with the resin, in which the rotary body is configured to rotate around a rotation axis that is parallel to a thickness direction of the sheet-shaped fiber; and manufacturing the sheet-shaped fiber in which a width and an orientation angle of the sheet-shaped fiber are varied. The manufacturing the sheet-shaped fiber includes rotating the rotary body, and causing, with the rotating the rotary body, force to act on the sheet-shaped fiber while feeding the sheet-shaped fiber in a feed direction, by frictional force generated between the rotary body and the sheet-shaped fiber. The force contains a component that is in a direction perpendicular to the thickness direction and to the feed direction.

An aspect of the technology provides a composite forming method that includes manufacturing a composite, in which the manufacturing the composite includes curing, by heating, a resin impregnated in the sheet-shaped fiber manufactured by the fiber width adjusting method according to any implementation of the technology.

An aspect of the technology provides a composite forming method that includes: stacking the sheet-shaped fiber manufactured by the fiber width adjusting method according to any implementation of the technology; and manufacturing a composite, in which the manufacturing the composite includes curing, by heating, a resin impregnated in the sheet-shaped fiber stacked by the stacking the sheet-shaped fiber.

DETAILED DESCRIPTION

Figure 1:
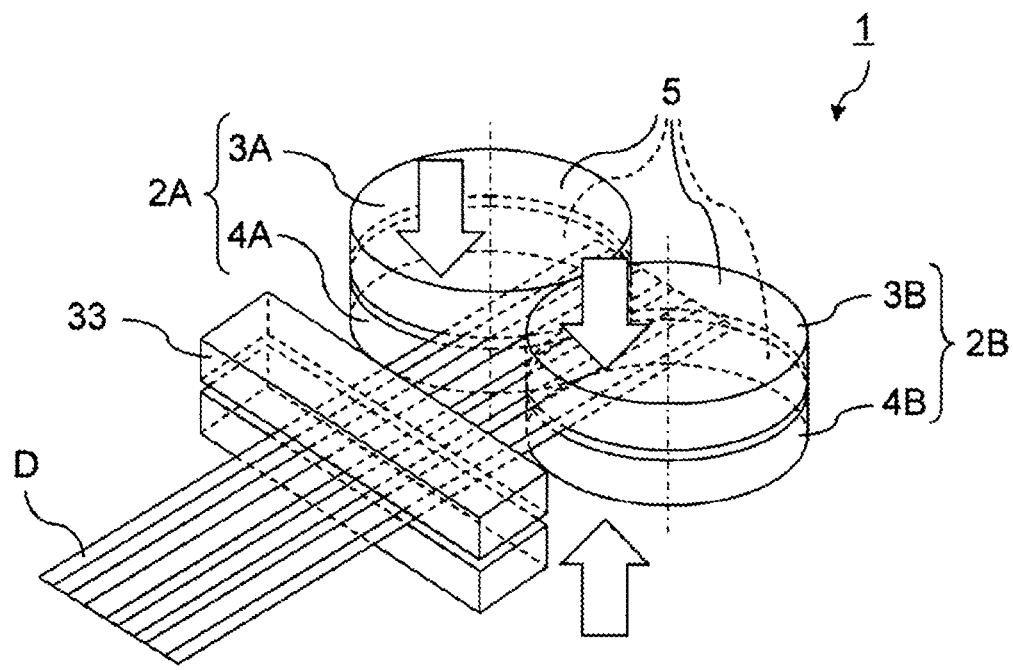
FIG. 1 is a perspective view of an example of a configuration of a fiber width adjusting apparatus according to one implementation of the technology.

In the following, a description is given, with reference to the accompanying drawings, of a fiber width adjusting apparatus, a fiber width adjusting method, and a composite forming method according to some implementations of the technology. Note that the following description is directed to illustrative examples of the disclosure and not to be construed as limiting the technology. Factors including, without limitation, numerical values, shapes, materials, components, positions of the components, and how the components are coupled to each other are illustrative only and not to be construed as limiting the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

A process often referred to as "opening" causes a bundle of fibers to be thin while widening the fiber bundle continuously by means of a roller or any other member. Such a fiber bundle typically includes a bundle of about 12,000 fibers to about 24,000 fibers each having a size of about 0.007 millimeters. In recent years, a tape-shaped fiber obtained by the opening has been available under the name of a "dry tape".

The dry tape attached with a thermoplastic binder, typically in the form of a sheet or powder, has also been available. The dry tape attached with the thermoplastic binder allows for stacking of the dry tapes while temporarily fixing those dry tapes by subjecting the thermoplastic binder to thermal fusion bonding.

The dry tape manufactured by the opening, however, has a uniform width. Further, orientation angles of and an interval between fibers structuring such a dry tape are uniform as well. Hence, to manufacture a composite in which a fiber orientation angle is in a radial direction, i.e., in which a direction of reinforcement derived from the fibers is oriented radially, it is necessary to arrange the dry tapes in a radial direction while providing a gap between the dry tapes, or to arrange the dry tapes such that portions of the respective dry tapes are overlapped with each other.

Further, it is difficult, or not possible, to allow the fiber orientation angle to be in the radial direction in a range narrower than a width of the dry tape, in consideration of uniform orientations of the fibers included in the single dry tape. In other words, as long as the dry tape has a width and the fiber orientation angle is uniform, an error occurs unavoidably in the orientations of the fibers relative to the radial direction. In particular, a technique based on the opening makes it possible to manufacture the dry tape having a low weight basis, but allows for manufacturing of only the dry tape having a small thickness and a large width. Accordingly, in this case, a large error occurs in the fiber orientation angle when manufacturing the composite in which the fiber orientation angle is in the radial direction in the same fiber-reinforced layer.

It is desirable to allow for manufacturing of a tape-shaped fiber that has a varied width and a varied fiber orientation and that serves as a material of a composite such as a glass fiber reinforced plastic (GFRP) or a carbon fiber reinforced plastic (CFRP).

First Example Implementation

FIG. 1 is a perspective view of an example of a configuration of a fiber width adjusting apparatus according to a first example implementation of the technology.

A fiber width adjusting apparatus 1 according to the first example implementation may adjust a width of a bundle of fibers that has been formed into a sheet in advance by opening. The fiber width adjusting apparatus 1 may also adjust orientation angles of the fibers of the fiber bundle. For example, the fiber width adjusting apparatus 1 adjusts the width of the fiber bundle having been formed into a sheet and the orientation angles of the fibers of the fiber bundle to thereby manufacture a tape-shaped fiber. The tape-shaped fiber may have the fiber orientation angle that is oriented radially and have a width that increases in a direction in which the fibers widen.

The fibers in the form of a sheet elongated in one direction, i.e., the tape-shaped fiber, may be referred to as a dry tape D. The dry tape D may be used as a material of a composite such as the CFRP, the GFRP, or any other fiber reinforced plastic. The dry tape D can be any dry tape on sale or any dedicated dry tape. Non-limiting examples of the dry tape may include: a dry tape attached with a thermoplastic binder that is in the form of a sheet, a net, a non-woven fabric, or powder; a dry tape attached with a thermosetting binder that is in the form of power or liquid; and a dry tape without any binder.

In the following, a description is given primarily of an example implementation in which the fiber width adjusting apparatus 1 adjusts a width of the dry tape D attached with the thermoplastic binder. The fiber width adjusting apparatus 1, however, may adjust a width of the dry tape D attached with the thermosetting binder or attached with no binder. In an alternative example implementation where the fiber width adjusting apparatus 1 adjusts the width of the dry tape D attached with the thermosetting binder, the fiber width adjusting apparatus 1 may adjust the width of the dry tape D, following which the thermosetting binder may be heated by a heater and thus cured to thereby fix the width-adjusted dry tape D.

The fiber width adjusting apparatus 1 may include a first rotary body 2A and a second rotary body 2B. The first rotary body 2A and the second rotary body 2B each rotate around a rotation axis while interposing the dry tape D. The rotation axis is parallel to a thickness direction of the dry tape D. In an example implementation, the first rotary body 2A may have a first rotary member 3A and a second rotary member 4A. The first rotary member 3A may rotate and come into contact with an upper surface of the dry tape D. The second rotary member 4A may be spaced away from the first rotary member 3A, and may rotate and come into contact with a lower surface of the dry tape D. The second rotary body 2B may similarly have a first rotary member 3B and a second rotary member 4B. The first rotary member 3B may rotate and come into contact with the upper surface of the dry tape D. The second rotary member 4B may be spaced away from the first rotary member 3B, and may rotate and come into contact with the lower surface of the dry tape D.

With this example configuration, a part of the dry tape D may be interposed between the first rotary member 3A and the second rotary member 4A of the first rotary body 2A that are spaced away from each other. Further, the remaining part of the dry tape D may be interposed between the first rotary member 3B and the second rotary member 4B of the second rotary body 2B that are spaced away from each other. In other words, the first rotary body 2A and the second rotary body 2B may be so disposed that their respective rotation axes are parallel to each other. Thus, the dry tape D may be interposed by the first rotary body 2A and the second rotary body 2B between the rotation axes of the respective first and the second rotary bodies 2A and 2B that are disposed parallel to each other.

The first rotary body 2A and the second rotary body 2B each may include a pair of disk-shaped rollers 5 in an example implementation illustrated in FIG. 1. For example, the first rotary member 3A and the second rotary member 4A structuring the first rotary body 2A may be the pair of disk-shaped rollers 5 whose centers of rotation are colinear, and the first rotary member 3B and the second rotary member 4B structuring the second rotary body 2B may also be the pair of disk-shaped rollers 5 whose centers of rotation are colinear. Thus, the fiber width adjusting apparatus 1 according to an example implementation illustrated in FIG. 1 may have a configuration in which end faces of the respective four disk-shaped rollers 5 interpose the dry tape D.

Figure 2:
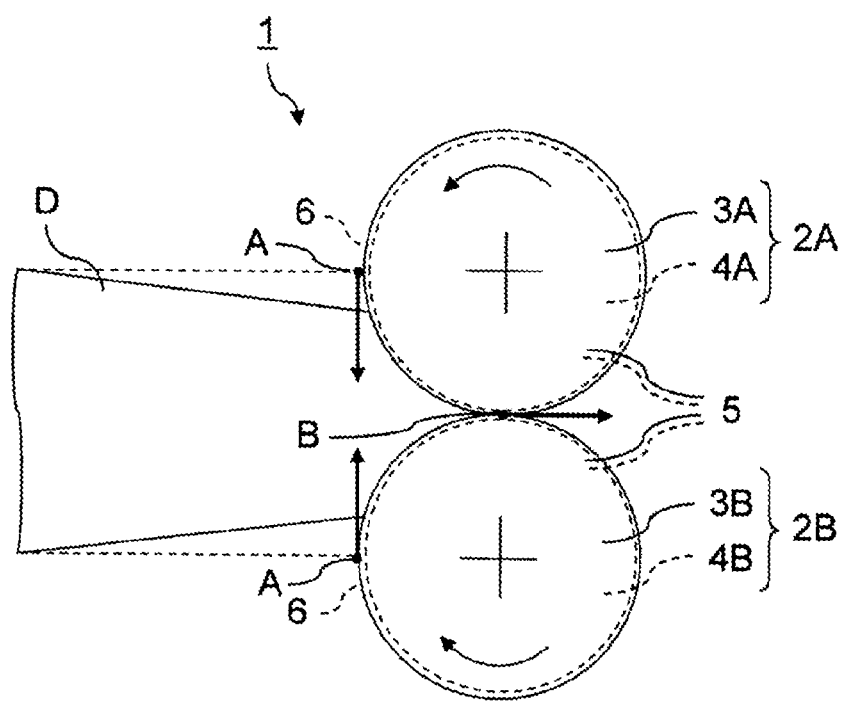
FIG. 2 is a top view of an example of a first rotary body and a second rotary body that are illustrated in FIG. 1.
Figure 3:
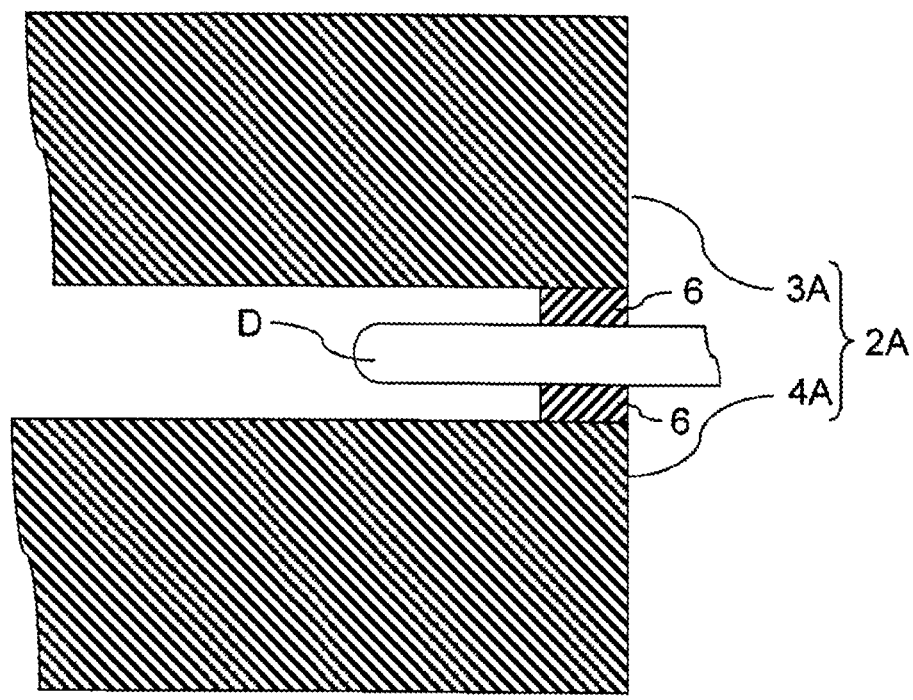
FIG. 3 is an enlarged vertical cross-sectional view of an example of edges of a first rotary member and a second rotary member that are illustrated in FIG. 2.
Figure 4:
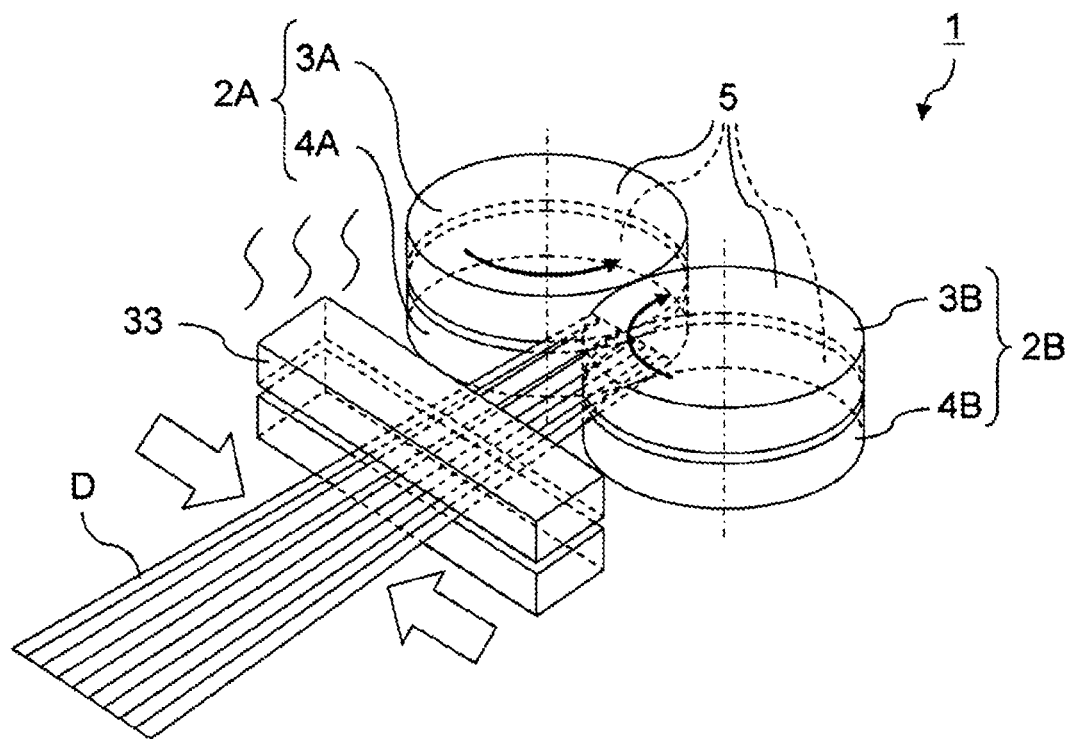
FIG. 4 is a perspective view of an example of the first rotary body and the second rotary body that are illustrated in FIG. 1 and are rotated.

FIG. 2 is a top view of the first rotary body 2A and the second rotary body 2B that are illustrated in FIG. 1. FIG. 3 is an enlarged vertical cross-sectional view of edges of the first rotary member 3A and the second rotary member 4A that are illustrated in FIG. 2. FIG. 4 is a perspective view of the first rotary body 2A and the second rotary body 2B that are illustrated in FIG. 1 and are rotated.

Referring to FIG. 2, the first rotary body 2A and the second rotary body 2B may respectively include a set of the first and the second rotary members 3A and 4A and a set of the first and the second rotary members 3B and 4B each can be the disk-shaped roller 5. Interposing ends of the dry tape D between the two sets of the first and the second rotary members 3A and 4A and the first and the second rotary members 3B and 4B and rotating the first rotary body 2A and the second rotary body 2B may cause force to act on edges positioned on both sides of the dry tape D. The force may act on the edges in a direction that narrows the width of the dry tape D, owing to frictional force generated between the dry tape D and each of the first and the second rotary members 3A and 4A and between the dry tape D and each of the first and the second rotary members 3B and 4B. In addition, tensile force that pulls the dry tape D in a length direction of the dry tape D may act on a middle part, positioned in a width direction, of the dry tape D. Further, force containing a first force component and a second force component may act on parts that are positioned between the edges of the dry tape D and the middle part of the dry tape D. The first force component may act in the direction that narrows the width of the dry tape D, and the second force component may so act as to pull the dry tape D in the length direction.

Thus, rotating the first rotary body 2A and the second rotary body 2B may allow the dry tape D to be fed in the length direction of the dry tape D as a feed direction. Further, force acts on the dry tape D while the dry tape D is fed in the feed direction as illustrated in FIG. 4, allowing the width of the dry tape D to be varied. The force contains a component that is perpendicular to both the thickness direction and the feed direction of the dry tape D, e.g., a component in the width direction of the dry tape D.

Note that surfaces of the respective disk-shaped rollers 5, structuring the first and the second rotary members 3A and 4A of the first rotary body 2A and the first and the second rotary members 3B and 4B of the second rotary body 2B, each may be provided with an annular protrusion 6 in an example implementation illustrated in FIGS. 2 and 3. Such an example implementation allows only surfaces of the respective protrusions 6, instead of the entire regions of the end faces of the respective rollers 5, to come into contact with the dry tape D. Thus, structuring the first and the second rotary members 3A and 4A and the first and the second rotary members 3B and 4B by the respective disk-shaped rollers 5 each having the protrusion 6 allows the force that is in a direction perpendicular to the feed direction to act on the dry tape D while feeding the dry tape D in the feed direction, owing to the frictional force generated between the dry tape D and each of the protrusions 6 of the respective first and second rotary members 3A and 4A and between the dry tape D and each of the protrusions 6 of the respective first and second rotary members 3B and 4B.

Accordingly, adjusting a width of the surface of each of the protrusions 6 allows the frictional force of an appropriate magnitude to be generated between the dry tape D and the corresponding roller 5 at an appropriate position. The frictional force thus generated between the dry tape D and each of the protrusions 6 of the respective rollers 5 allows the force, containing the component in the width direction of the dry tape D, to act on the dry tape D while feeding the dry tape D in the feed direction.

In an example implementation where the annular protrusions 6 are formed on the surfaces of the respective rollers 5, a component of the frictional force acting in the direction that narrows the width of the dry tape D, i.e., acting in the width direction perpendicular to the length direction of the dry tape D, may become maximum at positions A, of the respective protrusions 6, that come into contact with both sides of the dry tape D. In addition, only the tensile force that feeds the dry tape D may act on the dry tape D as the frictional force at a position B. The position B may be a point at which any of the circular protrusions 6 and a tangent parallel to the length direction of the dry tape D come into contact with each other.

In an example implementation, it is advantageous, but not necessary, that the middle part of the dry tape D be prevented from generating a region onto which no tensile force acts, in terms of improvement in quality of the dry tape D whose width has been varied. In other words, in an example implementation, increasing a feed amount of the dry tape D at the middle part to be greater than feed amounts of the both sides of the dry tape D leads to the improvement in the quality of the dry tape D whose width has been varied.

Figure 5:
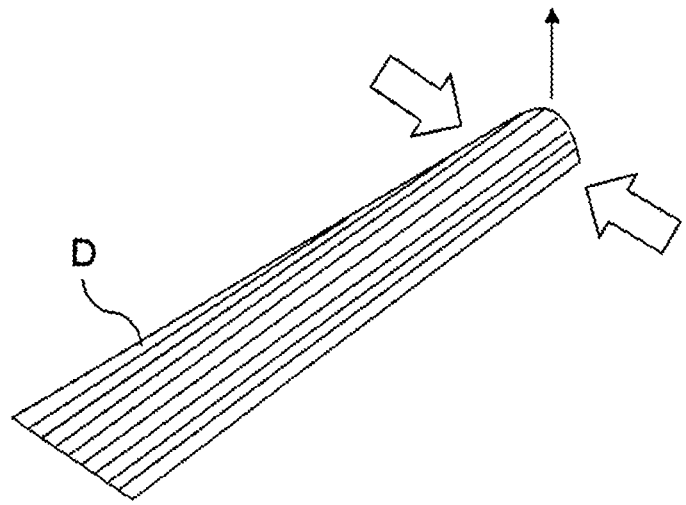
FIG. 5 is a perspective view for describing an example concern if a dry tape illustrated in FIG. 1 is applied only with force that acts in a width direction of the dry tape to thereby vary a width of the dry tape.

FIG. 5 is a perspective view for describing an example concern if the dry tape D illustrated in FIG. 1 is applied only with the force that acts in the width direction of the dry tape D to thereby vary the width of the dry tape D.

Referring to FIG. 5, fibers positioned on both side parts of the dry tape D incline or curve if only the force that acts in the width direction of the dry tape D is applied to one end of the dry tape D having been subjected to the opening. Such an inclination or a curve of the fibers at the both side parts can cause a difference, in necessary length of the fibers, between the middle part of the dry tape D and the both side parts of the dry tape D. This, however, does not cause a change in actual length of the fibers, meaning that a margin occurs in the fibers structuring the middle part of the dry tape D.

To prevent the generation of the margin at the middle part of the dry tape D, it is advantageous, but not necessary, that not only the force that acts in the width direction, but also the force that pulls the middle part of the dry tape D in the length direction of the dry tape D be applied to the dry tape D, by interposing the dry tape D by means of the first rotary body 2A and the second rotary body 2B as in an example implementation illustrated in FIGS. 1 to 4. Such application of the forces makes it possible to prevent the generation of the margin of the fibers at the middle part of the dry tape D while varying the width of the dry tape D.

In order to apply the tensile force to the middle part of the dry tape D, the fiber width adjusting apparatus 1 according to an example implementation may have a configuration in which the circular projection 6 that comes into contact with the dry tape D is provided on a circumference of each of the rollers 5. Further, in such a configuration, the roller 5 structuring the first rotary member 3A of the first rotary body 2A and the roller 5 structuring the first rotary member 3B of the second rotary body 2B may be so disposed as to be in contact with each other, whereas the roller 5 structuring the second rotary member 4A of the first rotary body 2A and the roller 5 structuring the second rotary member 4B of the second rotary body 2B may be so disposed as to be in contact with each other. Thus, in such an example implementation, the projections 6 may be provided on the edges of the respective two rollers 5 whose side surfaces come into contact with each other, allowing only the projections 6 provided at circumferential parts of the respective rollers 5 to come into contact with the dry tape D and rotating the rollers 5 by the frictional force.

In an example implementation where the rollers 5 are not provided with their respective projections 6, the end faces of the respective rollers 5 may come into contact with the dry tape D. Hence, in order to apply the tensile force to the middle part of the dry tape D, the fiber width adjusting apparatus 1 according to such an example implementation may have a configuration in which the roller 5 structuring the first rotary member 3A of the first rotary body 2A and the roller 5 structuring the first rotary member 3B of the second rotary body 2B are so disposed as to be in contact with each other, whereas the roller 5 structuring the second rotary member 4A of the first rotary body 2A and the roller 5 structuring the second rotary member 4B of the second rotary body 2B are so disposed as to be in contact with each other.

Accordingly, in an example implementation, it is advantageous, but not necessary, to cause a half of the dry tape D in the width direction, extending from one of the edges positioned on the both sides of the dry tape D to the middle part, to be interposed by the first rotary body 2A and to cause the remaining half of the dry tape D in the width direction, extending from the other of the edges to the middle part, to be interposed by the second rotary body 2B. One reason for this is to improve the quality of the dry tape D whose width has been varied.

To improve the quality of the dry tape D having the varied width, a radius of each of the rollers 5 in an example implementation may be made at least equal to or greater than a length of the half of the width of the dry tape D to be interposed between the rollers 5. This allows a distance between the first center of rotation and the second center of rotation to be equal to or greater than the width of the dry tape D. The first center of rotation may be common to both the first rotary member 3A and the second rotary member 4A of the first rotary body 2A, and the second center of rotation may be common to both the first rotary member 3B and the second rotary member 4B of the second rotary body 2B. With such an example configuration of the first rotary body 2A and the second rotary body 2B, the tensile force acts on the middle of the dry tape D while the force acts on the both sides of the dry tape D. The force contains the force component that is oriented in the width direction of the dry tape D and that acts toward the middle of the dry tape D.

Figure 6:
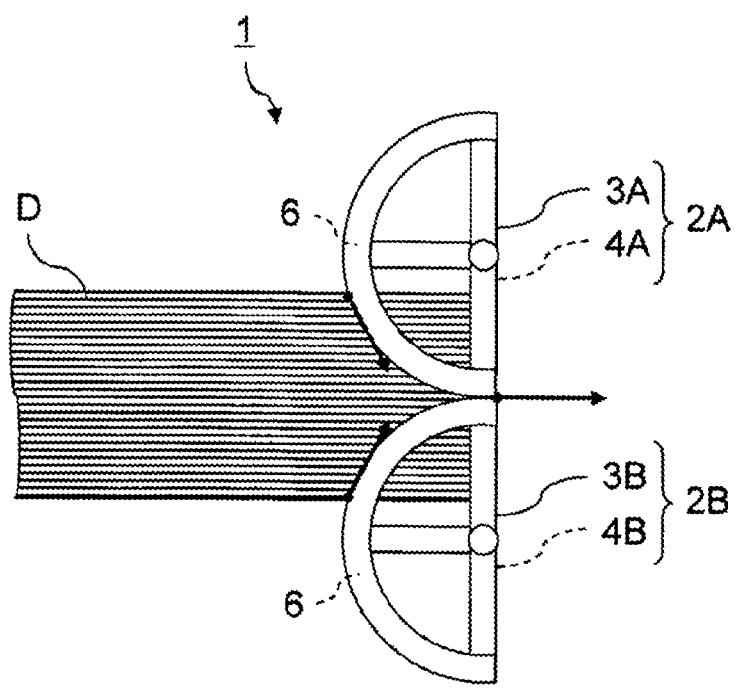
FIG. 6 is a top view of a modification example of the first rotary members and the second rotary members that are illustrated in FIG. 2.

FIG. 6 is a top view of a modification example of the first rotary members 3A and 3B and the second rotary members 4A and 4B that are illustrated in FIG. 2.

In an example implementation where the projections 6 are provided on the first rotary members 3A and 3B and the second rotary members 4A and 4B, the projections 6 come into contact with the dry tape D and thereby cause the force to act on the dry tape D. Hence, the first rotary body 2A and the second rotary body 2B in a modification example each may include a pair of rotary members that are provided with curved projections 6, instead of the pair of disk-shaped rollers 5. For example, the curved projection 6 may be provided on each of the first and the second rotary members 3A, 3B, 4A, and 4B that are not the disk-shaped rollers 5. With this example configuration, the frictional force is generated between the dry tape D and each of the protrusions 6, allowing the force, oriented in the direction perpendicular to the feed direction, to act on the dry tape D while feeding the dry tape D in the feed direction.

The projections 6 each may have any appropriate shape determined by an actual experiment. The projections 6 each having a shape of a circular arc or a part of the circular arc in an example implementation allow the projections 6 to come into contact with each other constantly between the first rotary body 2A and the second rotary body 2B even when the first and the second rotary bodies 2A and 2B are rotated, and allow the tensile force to act on the middle part of the dry tape D accordingly.

The projections 6 each may have a shape of a quadratic curve or any other curve, such as a parabolic shape or an elliptical shape. In other words, the projections 6 each may have a curved shape besides the circular arc shape. In such an example implementation, an interval between the rotation axes of the respective first and the second rotary bodies 2A and 2B may be made variable such that the tensile force acts on the middle part of the dry tape D when the first rotary body 2A and the second rotary body 2B are rotated.

Specifically, the thickness of the dry tape D increases when the width of the dry tape D is made smaller as a result of interposing the dry tape D by the first rotary body 2A and the second rotary body 2B. In other words, applying the force that is in the width direction of the dry tape D and the tensile force that is in the feed direction does not vary thicknesses of the fibers themselves and an interval of the fibers. This means that the fibers positioned on the both sides of the dry tape D move in the width direction of the dry tape D, increasing the thickness of the dry tape D just as much as the decrease in the width of the dry tape D.

Accordingly, in a modification example, an interval between the first and the second rotary members 3A and 4A and an interval between the first and the second rotary members 3B and 4B may be made variable on the basis of the thickness of the dry tape D.

Figure 7A:
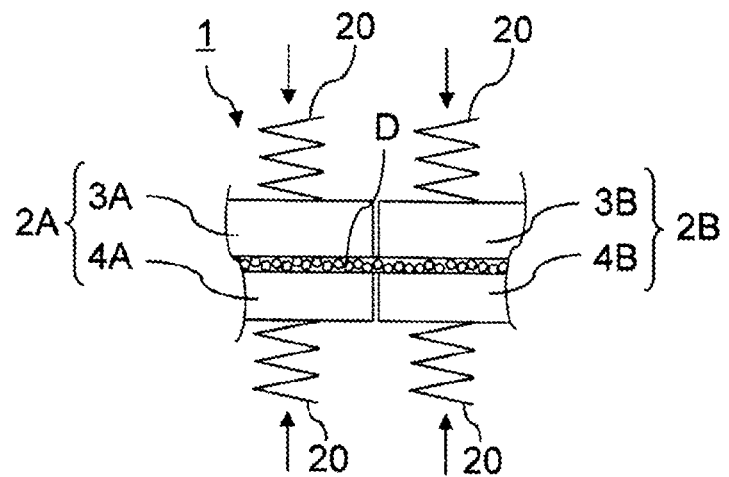
FIGS. 7A and 7B are each a front view of an example of the first rotary members and the second rotary members that are illustrated in FIG. 1 and are provided with elastic members to thereby allow an interval between the first and the second rotary members and an interval between the first and the second rotary members to be varied.
Figure 7B:
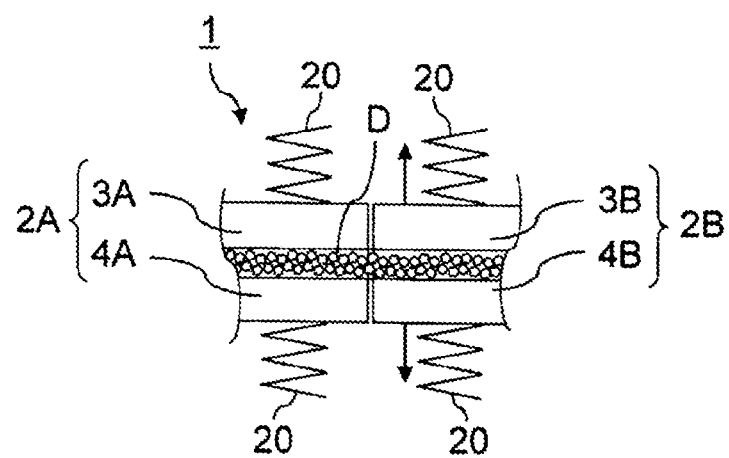

FIGS. 7A and 7B are each a front view of the first rotary members 3A and 3B and the second rotary members 4A and 4B that are illustrated in FIG. 1 and are provided with elastic members 20 to thereby allow an interval between the first and the second rotary members 3A and 4A and an interval between the first and the second rotary members 3B and 4B to be varied.

Referring to FIG. 7A, the intervals between the first and the second rotary members 3A and 4A and between the first and the second rotary members 3B and 4B may correspond to the thickness of the dry tape D that has been subjected to the opening, when one end of the dry tape D is interposed between the two sets of the first and the second rotary members 3A and 4A and the first and the second rotary members 3B and 4B.

In such a situation, referring to FIG. 7B, the width of the dry tape D may be made smaller whereas the thickness of the dry tape D may become slightly larger when the first rotary body 2A and the second rotary body 2B are rotated. Hence, one or both of the set of first and second rotary members 3A and 4A and the set of first and second rotary members 3B and 4B may be provided with the elastic member 20. For example, the elastic member 20 may be a spring that expands and contracts in a direction of the corresponding rotation axis, or any other member having elasticity and allows for expansion and contraction in the direction of the rotation axis. Such an example configuration allows the intervals between the first and the second rotary members 3A and 4A and between the first and the second rotary members 3B and 4B to fit in with the thickness of the dry tape D on the basis of the change in the thickness of the dry tape D.

Further, in an example implementation, the first rotary members 3A and 3B each may be made retractable to a retracted position, in order to allow one end of the dry tape D to be set easily between the first and the second rotary members 3A and 4A and between the first and the second rotary members 3B and 4B. For example, the first rotary members 3A and 3B may be raised to allow one end of the dry tape D to be placed onto the second rotary members 4A and 4B, following which the first rotary members 3A and 3B may be lowered to interpose one end of the dry tape D between the first and the second rotary members 3A and 4A and between the first and the second rotary members 3B and 4B. Non-limiting examples of a mechanism that moves any of the first rotary members 3A and 3B in a vertical direction and/or any other direction may include a ball screw, a rack and pinion, a cylinder mechanism, and any other mechanism that allows for vertical movement of any of the first rotary members 3A and 3B.

Note that the illustrated example implementation is based on a configuration in which the first rotary members 3A and 3B are so disposed as to come into contact with the upper surface of the dry tape D, whereas the second rotary members 4A and 4B are so disposed as to come into contact with the lower surface of the dry tape D, where the thickness direction of the dry tape D corresponds to the vertical direction. In an alternative example implementation, however, the first and the second rotary members 3A and 4A and the first and the second rotary members 3B and 4B may be so disposed that the thickness direction of the dry tape D corresponds to a horizontal direction. In such an alternative example implementation, the rotation axes of the first and the second rotary members 3A and 4A and the rotation axes of the first and the second rotary members 3B and 4B are each oriented in the horizontal direction.

Disposing, however, the first and the second rotary members 3A and 4A and the first and the second rotary members 3B and 4B such that their respective rotation axes are oriented in the vertical direction allows one end of the dry tape D to be placed on the second rotary members 4A and 4B as in the illustrated example implementation. Thus, the illustrated example implementation eliminates a configuration, such as a guide, that prevents falling of the dry tape D.

The first and the second rotary members 3A and 4A and the first and the second rotary members 3B and 4B may be rotated automatically by means of a rotation mechanism that includes a drive source such as a motor. In an alternative example implementation, the first and the second rotary members 3A and 4A and the first and the second rotary members 3B and 4B may be rotated manually. The first and the second rotary members 3A and 4A and the first and the second rotary members 3B and 4B each may be rotated at a speed of rotation that allows the dry tape D to be fed in the feed direction by means of the frictional force. Hence, the first rotary body 2A and the second rotary body 2B may be rotated at the same rotation speed in directions opposite to each other.

Accordingly, in an example implementation, the first rotary body 2A and the second rotary body 2B may have their respective rotation shafts that are coupled to an output shaft of a single motor to thereby allow the first and the second rotary bodies 2A and 2B to be rotated in the reverse directions with each other at equal speed. The rotation shafts may be coupled to the output shaft of the motor through a member such as a gear, a power transmission belt, or any other member that transmits drive force of the motor to any rotation shaft. In an alternative implementation, the first rotary body 2A and the second rotary body 2B may be coupled to their respective motors individually.

Figure 8A:
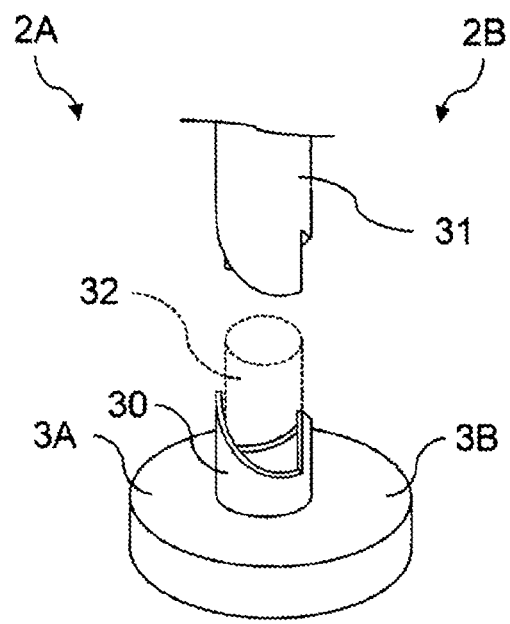
FIGS. 8A and 8B are each a perspective view of an example in which the first rotary body and the second rotary body illustrated in FIG. 1 are made rotatable without utilizing a drive source.
Figure 8B:
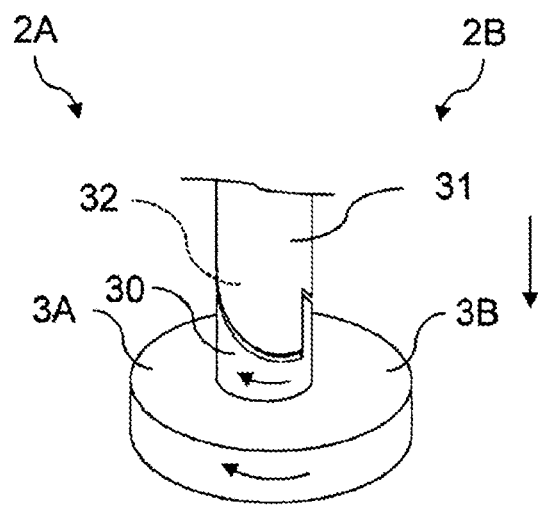

FIGS. 8A and 8B are each a perspective view of an example in which the first rotary body 2A and the second rotary body 2B illustrated in FIG. 1 are made rotatable without utilizing a drive source.

Referring to FIG. 8A, an end face of each of the first and the second rotary members 3A and 3B, which is positioned on the side opposite to the side on which the dry tape D is positioned, may be provided with a cylindrical part 30. In other words, upper surfaces of the respective first and second rotary members 3A and 3B each may have the cylindrical part 30.

The cylindrical part 30 may have a shape whose end face undulates in position toward the corresponding first rotary member 3A or 3B. For example, the cylindrical part 30 may include the end face having a shape that goes closer to the corresponding first rotary member 3A or 3B gradually from a position that is most distant from the corresponding first rotary member 3A or 3B. The number of end faces, located at the position most distant from the corresponding first rotary member 3A or 3B, of the cylindrical part 30 may be one or two or more. In other words, the number of vertexes of the cylindrical part 30 may be one or two or more. FIGS.

8A and 8B illustrate an example implementation in which the number of vertexes of the cylindrical part 30 is two.

The example implementation illustrated in FIGS. 8A and 8B may also include a cylindrical pressing member 31 and a rotation shaft 32. The cylindrical pressing member 31 may have an end face that fits with the end face of the cylindrical part 30 provided on the corresponding first rotary member 3A or 3B. The rotation shaft 32 may be rotatably inserted into the corresponding first rotary member 3A or 3B, the cylindrical part 30, and the cylindrical pressing member 31. The rotation shaft 32 may be so rotatably inserted into those members as to provide a tolerance derived from clearance fit.

Such an example configuration allows the corresponding first rotary member 3A or 3B to rotate simply by sliding the cylindrical pressing member 31 in a length direction of the rotation shaft 32 as illustrated in FIG. 8B. For example, a phase in a direction of rotation of the cylindrical pressing member 31 may be determined such that the end face of the cylindrical pressing member 31 and the end face of the cylindrical part 30 provided on the corresponding first rotary member 3A or 3B shift mutually in a direction of rotation of the corresponding first rotary member 3A or 3B. After determining the phase in the rotation direction of the cylindrical pressing member 31, the end face of the cylindrical pressing member 31 may be pressed against the end face of the cylindrical part 30 provided on the corresponding first rotary member 3A or 3B, causing the cylindrical part 30 provided on the corresponding first rotary member 3A or 3B to rotate in such a manner that the end face of the cylindrical part 30 fits with the end surface of the cylindrical pressing member 31. This makes it possible to rotate the first rotary members 3A and 3B integrated with their respective cylindrical parts 30.

The second rotary members 4A and 4B may also have a mechanism similar to the example mechanism described previously to allow the second rotary members 4A and 4B to rotate without utilizing a drive source. In other words, the example configuration described with reference to FIGS. 8A and 8B allows an operator to manually rotate the first rotary members 3A and 3B and/or the second rotary members 4A and 4B.

Accordingly, interposing one end of the dry tape D between the first rotary body 2A and the second rotary body 2B and rotating the first rotary body 2A and the second rotary body 2B allows the dry tape D having the varied width to be manufactured as described above, owing to the frictional force generated between the dry tape D and each of the first and the second rotary bodies 2A and 2B. In other words, it is possible to manufacture the dry tape D, whose width has been varied as a result of applying, while feeding the dry tape D in the feed direction, the force that contains the component that is in the direction perpendicular to the thickness direction and to the feed direction of the dry tape D.

Note that amounts of change in respective distances between the first and the second rotary members 3A and 4A and between the first and the second rotary members 3B and 4B are small even if the distances become large in accordance with the thickness of the dry tape D. Hence, both ends of respective parts of the dry tape D, which have been fed more toward a region in the feed direction than locations of the respective rotation axes of the first and the second rotary bodies 2A and 2B, may sometimes be applied with force that broadens the dry tape D, attributable to the frictional force generated between the first and the second rotary members 3A and 4A and between the first and the second rotary members 3B and 4B. In this case, the ends in the feed direction of the dry tape D may possibly be broadened and become thin again accordingly.

In other words, the dry tape D, whose width has been varied as a result of rotating the first rotary body 2A and the second rotary body 2B, may involve generation of parts that have been broadened after becoming narrow in width as a result of receiving, from the first and the second rotary bodies 2A and 2B, the force that contains the component that is in the direction perpendicular to the thickness direction and to the feed direction of the dry tape D. In such a case, the parts of the dry tape D that have been broadened after becoming narrow in width may be cut and discarded, to thereby manufacture the dry tape D having a width that becomes smaller with decreasing distance toward an end of the dry tape D. Further, the orientation angles of the fibers structuring the thus-manufactured dry tape D are oriented in the radial direction.

In an example implementation where the dry tape D having the varied width is to be manufactured with use of the dry tape D that has the thermoplastic binder and that has been subjected to the opening, the dry tape D may be heated by means of a heater 33 before interposing the dry tape D by the first rotary body 2A and the second rotary body 2B as illustrated in FIGS. 1 and 4. Such an example configuration helps to keep the width of the dry tape D following the variation in the width as much as possible. In other words, the heater 33 may be provided upstream of the first and the second rotary bodies 2A and 2B in the feed direction of the dry tape D, in the example implementation where the dry tape D has the thermoplastic binder.

The configuration according to the example implementation illustrated in FIGS. 1 and 4 may include the heater 33 that comes into surface contact with both the upper surface and the lower surface of the dry tape D. Such an example configuration not only helps to heat the dry tape D from its both sides but also to interpose the dry tape D by the heater 33 and thus guide the dry tape D.

Appropriate distances between the first rotary body 2A and the heater 33 and between the second rotary body 2B and the heater 33 may be determined by an experiment, calculation, or any other factor that allows for determination of the appropriate distances. Determining such appropriate distances helps to melt the thermoplastic binder included in the dry tape D, whose width has been varied by the force received from the first and the second rotary bodies 2A and 2B, by means of the heat applied instantaneously from the heater 33, as illustrated by way of example in FIG. 4. Specifically, varying a width of a part, interposed by the first and the second rotary bodies 2A and 2B, of the dry tape D allows a width of a part, not interposed by the first and the second rotary bodies 2A and 2B, of the dry tape D to also vary in accordance with the variation in the width of the part interposed by the first and the second rotary bodies 2A and 2B. Hence, it is possible to melt the thermoplastic binder included in the dry tape D whose width has been varied, owing to the heater 33 disposed upstream of the first and the second rotary bodies 2A and 2B.

Thereafter, the dry tape D following the variation in the width may be cooled to cure the thermoplastic binder and thereby to keep the width of the dry tape D. In other words, this allows the dry tape D having the adjusted degree of opening to be fixed by means of the thermoplastic binder.

The dry tape D thus-manufactured through the fiber width adjusting method according to any implementation of the technology, such as an example implementation described above, makes it possible to form the composite in which the fiber orientation angle is in the radial direction.

Figure 9:
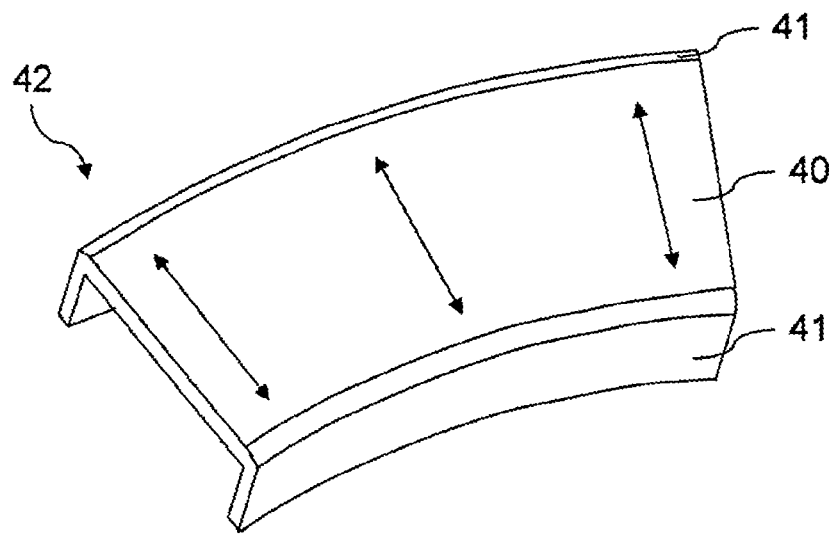
FIG. 9 is a perspective view of an example of a shape of a composite formable with use of, as a material, the dry tape that is manufactured by the fiber width adjusting apparatus illustrated in FIG. 1.

FIG. 9 is a perspective view of an example of a shape of a composite formable with use of, as a material, the dry tape D that is manufactured by the fiber width adjusting apparatus 1 illustrated in FIG. 1.

Causing orientation angles of fibers to be in a radial direction may be preferable in some situations, such as in an example case where a composite 42 illustrated by way of example in FIG. 9 is to be manufactured. Referring to FIG. 9, the composite 42 may have a web 40 and a flange 41 that is provided on the web 40. The web 40 may have such a shape in which a fan-like shape having a smaller radius is cut out from a fan-like shape having a larger radius. In such an example case, the composite 42 may be manufactured with use of, as a material, the dry tape D in which the fiber orientation angle is in the radial direction.

Figure 10:
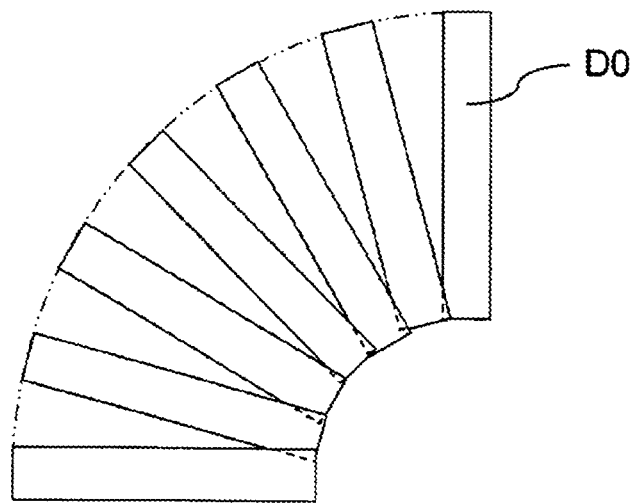
FIG. 10 is a top view for describing an example concern if a typical dry tape having a fixed width and a fixed fiber orientation angle is used to manufacture the composite illustrated in FIG. 9.
Figure 11:
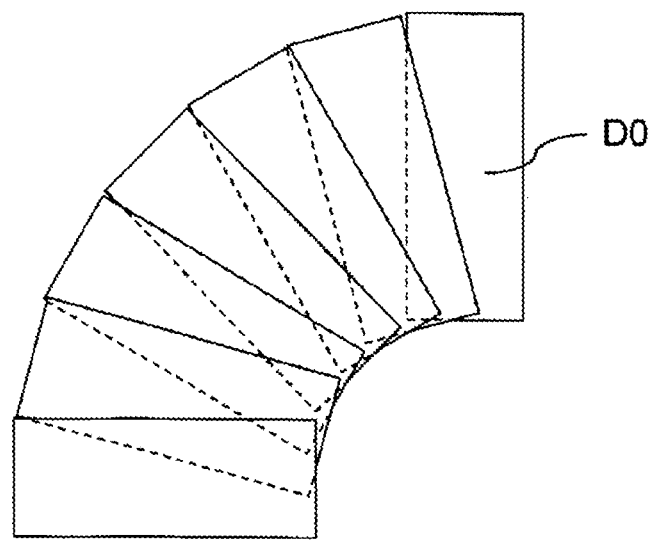
FIG. 11 is a top view for describing another example concern if the typical dry tape having the fixed width and the fixed fiber orientation angle is used to manufacture the composite illustrated in FIG. 9.

FIG. 10 is a top view for describing an example concern if a typical dry tape DO having a fixed width and a fixed fiber orientation angle is used to manufacture the composite 42 illustrated in FIG. 9. FIG. 11 is a top view for describing another example concern if the typical dry tape DO having the fixed width and the fixed fiber orientation angle is used to manufacture the composite 42 illustrated in FIG. 9.

To manufacture the web 40 having the shape in which the smaller-radius fan-like shape is cut out from the larger-radius fan-like shape with use of the typical dry tape DO having the fixed width and the fixed fiber orientation angle, the dry tape DO may have to be disposed in such a manner that a gap is provided on outer side between the dry tape DO and the adjacent dry tape DO as illustrated in FIG. 10. Alternatively, the dry tape DO may have to be disposed in such a manner that the dry tape DO is overlapped, on its inner side, with the adjacent dry tape DO as illustrated in FIG. 11.

Referring to FIG. 10, disposing the dry tape DO with the gap being provided on the outer side between the dry tape DO and the adjacent dry tape DO leads to a decrease in quality in terms of strength of the composite 42. Overlapping the dry tapes DO as illustrated in FIG. 11 leads to a waste of material. In addition thereto, the orientation angles of the fibers structuring the single dry tape DO are in a length direction of the dry tape DO, and only a fraction of the fibers involves a length direction that is in the radial direction. Hence, an error occurs highly likely in the orientation angles of the fibers structuring the dry tape DO with respect to the radial direction.

Figure 12:
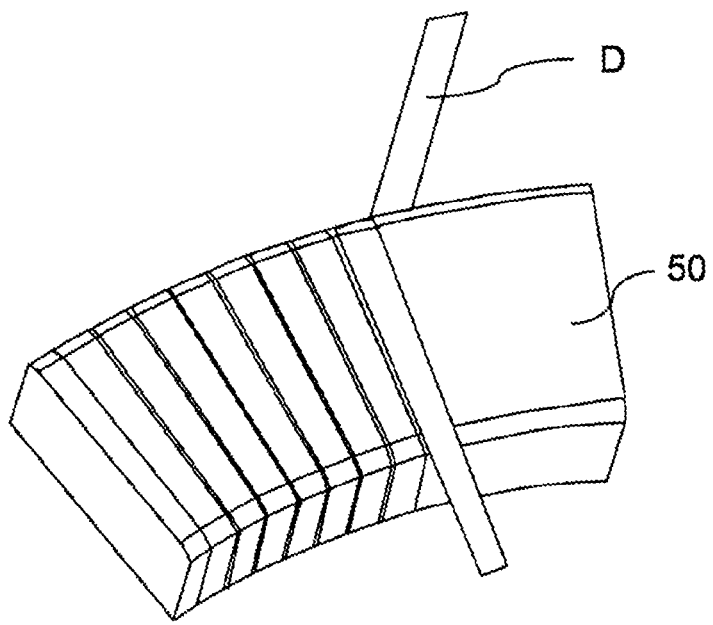
FIG. 12 is a perspective view for describing an example of a method of forming the composite illustrated in FIG. 9 with use of the dry tape manufactured by the fiber width adjusting apparatus illustrated in FIG. 1.

FIG. 12 is a perspective view for describing an example of a method of forming the composite 42 illustrated in FIG. 9 with use of the dry tape D manufactured by the fiber width adjusting apparatus 1 illustrated in FIG. 1.

The dry tape D manufactured by the fiber width adjusting apparatus 1 illustrated in FIG. 1 has the fiber orientation angle that is in the radial direction, and has the width that becomes gradually smaller with decreasing distance from one end toward the other end. Hence, for example, it is possible to arrange the dry tape D on a jig 50 without causing the gap or the overlapping as illustrated in FIG. 12. The jig 50 may have a shape that fits with the composite 42 illustrated in FIG. 9 that has the web 40 and the flange 41 provided on the web 40.

In addition thereto, it is possible to manufacture the composite 42 having the fiber orientation angle that is in the radial direction, owing to the dry tape D whose fibers structuring the dry tape D have the orientation angles that are in the radial direction. Accordingly, it is possible to manufacture the composite 42 that is free from an error in the fiber orientation angle.

The dry tape D may be stacked on the jig 50 illustrated by way of example in FIG. 12 in an example implementation where the composite 42 is to be manufactured with use of the dry tape D as a material. Thereafter, a process of impregnating a stack of the dry tape D with a thermosetting resin may be performed. The dry tape D may be stacked manually by an operator, or may be stacked using an automatic stacker. In an example implementation where the dry tape D includes the thermoplastic binder, the dry tape D may be stacked while temporarily fixing the dry tape D through bonding the thermoplastic binder by means of the heater.

Figure 13:
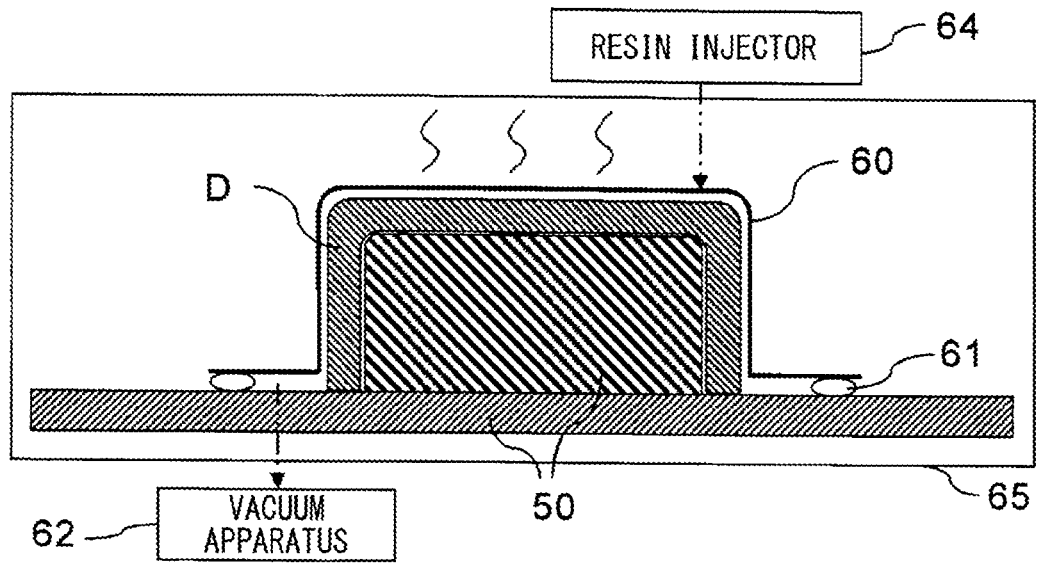
FIG. 13 is a transverse cross-sectional view for describing a method that forms, on the basis of VaRTM, the composite through injecting a resin into a stack of the dry tape provided on a jig illustrated in FIG. 12, and curing the resin-injected stack of the dry tape by heating.
Figure 14:
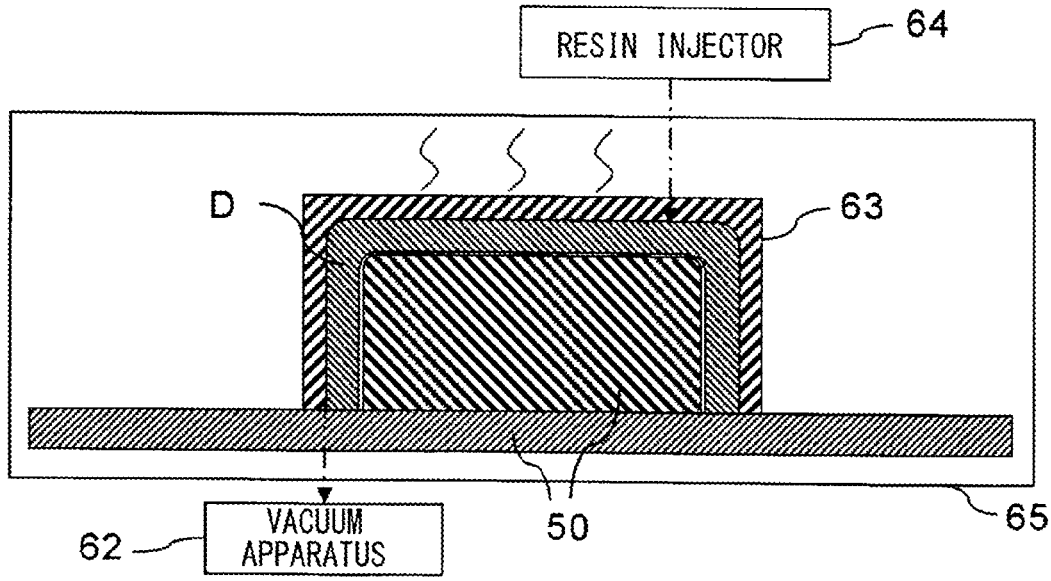
FIG. 14 is a transverse cross-sectional view for describing a method that forms, on the basis of matched-die RTM, the composite through injecting a resin into the stack of the dry tape provided on the jig illustrated in FIG. 12, and curing the resin-injected stack of the dry tape by heating.

FIG. 13 is a transverse cross-sectional view for describing a method that forms, on the basis of a vacuum-assisted resin transfer molding (VaRTM), the composite 42 through injecting a resin into the stack of the dry tape D provided on the jig 50 illustrated in FIG. 12, and curing the resin-injected stack of the dry tape D by heating. FIG. 14 is a transverse cross-sectional view for describing a method that forms, on the basis of matched-die RTM, the composite 42 through injecting a resin into the stack of the dry tape D provided on the jig 50 illustrated in FIG. 12, and curing the resin-injected stack of the dry tape D by heating.

Referring to FIG. 13, in an example implementation where the composite 42 is to be formed by the VaRTM, the stack of the dry tape D provided on the jig 50 may be covered with a bagging film 60. An edge of the bagging film 60 may be attached, by means of a sealant 61, to the jig 50 that serves as a die directed to formation of the composite 42. Thereafter, a region sealed by the bagging film 60 may be subjected to decompression by a vacuum apparatus 62. In other words, the stack of the dry tape D may be subjected to bagging by vacuuming performed by the vacuum apparatus 62.

Referring to FIG. 14, in an example implementation where the composite 42 is to be formed by the matched-die RTM, the stack of the dry tape D may be disposed in a space between a top die 63 and the jig 50 that serves as a bottom die directed to formation of the composite 42. Thereafter, the space between the jig 50 and the top die 63 may be subjected to vacuuming by the vacuum apparatus 62.

Following completion of the vacuuming, a thermosetting resin may be injected from a resin injector 64 in both of the example cases where the bagging by means of the bagging film 60 is performed as illustrated in FIG. 13 and where the top die 63 is used as illustrated in FIG. 14. In other words, the resin may be injected into the region covered by the bagging film 60 or into the space formed between the jig 50 and the top die 63, allowing the stack of the dry tape D to be impregnated with the resin. Incidentally, the stack of the dry tape D, shaped to fit in with the shape of the composite 42 and before being impregnated with the resin, can also be referred to as a dry preform.

The resin may be heated in the resin injector 64 as necessary to allow the resin to have fluidity. The jig 50 may include a heater and may thereby heat the resin to prevent a temperature of the resin from decreasing in an example case where the heated resin is to be injected. In such an example case where the jig 50 includes the heater, the jig 50 may also include a pipe that allows a heating fluid, such as a heating steam, hot air, or hot water, to flow therethrough. Alternatively, the jig 50 may include an electric heater. In an example case where the top die 63 is used as illustrated in FIG. 14, the top die 63 may include a heater.

Thereafter, curing, by heating, may be performed of the thermosetting resin impregnated in the stack of the dry tape D. For example, heating may be performed by a heater 65 as illustrated in FIGS. 13 and 14 up to a temperature at which the resin cures. Thus, the resin may be cured and the composite 42, having been formed as described above, may be manufactured. In other words, this forms the composite 42 having the web 40 and the flange 41 as illustrated by way of example in FIG. 9.

Note that, in an example implementation described above, a matrix resin configuring the composite 42 may be the thermosetting resin. In an alternative example implementation, however, the matrix resin may be a thermoplastic resin. In such an alternative example implementation where the matrix resin is the thermoplastic resin, the composite 42 may be manufactured with use of any typical method of manufacturing a composite which utilizes the thermoplastic resin as the matrix resin.

It is to be also noted that, besides a composition of the composite 42 for which any composition may be used as described above without being limited to the illustrated implementations, the composite 42 having any desired shape may be manufactured without being limited to the illustrated implementations. For example, in addition to the composite 42 having the web 40 and the flange 41, the dry tape D whose fiber orientation angle and width have been adjusted by the fiber width adjusting apparatus 1 may be used as a material for forming any other composite in which the fiber orientation angle is in the radial direction similarly. Further, application of the fiber width adjusting apparatus 1 is not limited to the fibers in the form of a tape. The fiber width adjusting apparatus 1 according to any implementation of the technology may adjust the width and the orientation angles of the fibers in the form of a sheet that has widths in two directions.

The fiber width adjusting apparatus 1 may also adjust the width and the orientation angle of the tape-shaped or sheet-shaped fiber that has been impregnated with the resin, besides the width and the orientation angle of the tape-shaped or sheet-shaped fiber that is before the impregnation of the resin. The sheet-shaped fiber following the impregnation with the resin can also be referred to as a prepreg.

In an example implementation where the prepreg is used as a material of the composite, the prepregs may be stacked on a jig directed to the formation of the composite and may be shaped by the jig. Thereafter, a stack of the thus-shaped prepregs may be cured by heating under a pressure to thereby form the composite. The pressurization of the stack of the prepregs may be performed using bagging that utilizes a bagging film or using a top die.

The fiber width adjusting apparatus 1, the fiber width adjusting method, and the composite forming method according to any of the foregoing example implementations each allow the width and the orientation angle of the sheet-shaped fiber to be adjusted by rotating the first rotary body 2A and the second rotary body 2B while interposing the sheet-shaped fiber by the first and the second rotary bodies 2A and 2B.

Example Effects

Accordingly, the fiber width adjusting apparatus 1, the fiber width adjusting method, and the composite forming method according to any implementation of the technology each make it possible to manufacture the dry preform and the composite in which the fiber orientation angle is in the radial direction. It is to be noted that an existing opening technique allows for manufacturing of only a tape-shaped fiber having a constant thickness. Any implementation of the technology, however, allows for manufacturing of the tape-shaped fiber that is varied to have a desired width and/or a desired thickness.

Second Example Implementation

Figure 15:
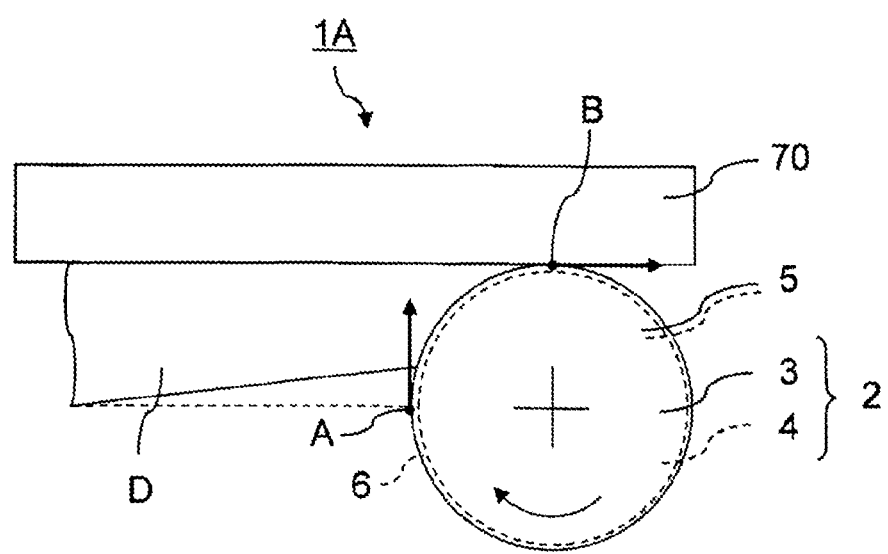
FIG. 15 is a top view of an example of a configuration of a fiber width adjusting apparatus according to one implementation of the technology.

FIG. 15 is a top view of an example of a configuration of a fiber width adjusting apparatus according to a second example implementation of the technology.

A fiber width adjusting apparatus 1A according to the second example implementation differs from the fiber width adjusting apparatus 1 according to the first example implementation, in that the fiber width adjusting apparatus 1A has a configuration that includes a single rotary body 2 and a guide 70 that guides the dry tape D, in place of the first rotary body 2A and the second rotary body 2B. Other configurations and workings of the fiber width adjusting apparatus 1A according to the second example implementation are similar to or substantially the same as those of the fiber width adjusting apparatus 1 according to the first example implementation. Accordingly, a description is given of the second example implementation with reference to only the top view of the rotary body 2 and the guide 70, and configurations same as or corresponding to those described in the first example implementation are denoted with the same reference numerals to avoid any redundant description.

The fiber width adjusting apparatus 1A may have a configuration in which the rotary body 2 is in contact with the guide 70 or disposed close to the guide 70. The guide 70 may have a shape of a wall surface, or any other shape that guides one of the edges of the dry tape D. The rotary body 2 may have a first rotary member 3 and a second rotary member 4 that interpose the dry tape D between the first and the second rotary members 3 and 4, as with the first example implementation. The first rotary member 3 and the second rotary member 4 may be so disposed as to be in contact with or close to the wall-surfaced guide 70. Thus, the dry tape D may be interposed by the first rotary member 3 and the second rotary member 4 in a region between a rotation axis of the rotary body 2 and the wall-surfaced guide 70.

With this example configuration, one of the edges of the dry tape D may be guided by the wall-surfaced guide 70. Further, the tensile force may act, from the rotary body 2, on the edge of the dry tape D which is positioned adjacent to the wall-surfaced guide 70, whereas the force containing the force component may act, from the rotary body 2, on the other of the edges of the dry tape D which is positioned away from the wall-surfaced guide 70. The force component may act in the direction that narrows the width of the dry tape D. Thus, rotating the rotary body 2 allows the width and the fiber orientation angle of the dry tape D to be varied.

The foregoing second example implementation also makes it possible to achieve effects that are similar to those of the first example implementation. Further, the single rotary body 2 is provided in the second example implementation, allowing for easier control and operation of the rotary body 2. In particular, the second example implementation eliminates the mechanism, optionally provided in the first example implementation, that brings the rotation speeds of the first rotary body 2A and the second rotary body 2B to be coincident with each other.

OTHER IMPLEMENTATIONS

Although some implementations of the technology have been described in the foregoing, the implementations described above are merely illustrative and should not be construed as limiting the scope of the technology. The novel method and apparatus described herein as example implementations of the technology may be embodied in the form of any other implementation. Further, it should be appreciated that various omissions, modifications, and alterations may be made to example implementations of the technology described herein without departing from the scope as defined by the appended claims. The appended claims and equivalents are intended to encompass such omissions, modifications, and alterations as various implementations and modification examples of the technology in so far as they fall within the scope of the appended claims or the equivalents thereof.

The invention claimed is:

1. A fiber sheet width adjusting apparatus, comprising:
a rotary body configured to rotate around a rotation axis while interposing a fiber sheet, and to cause, by a frictional force generated between the rotary body and the fiber sheet, a force to act on the fiber sheet while feeding the fiber sheet in a feed direction to vary a width and an orientation angle of the fiber sheet, the fiber sheet being impregnated with a resin or being before the impregnation with the resin, the rotation axis being parallel to a thickness direction of the fiber sheet, the force containing a component that is in a direction perpendicular to the thickness direction and to the feed direction,
wherein the rotary body comprises two rotary bodies that are disposed to allow respective rotation axes of the two rotary bodies to be parallel to the thickness direction of the fiber sheet and further to be parallel to each other, the two rotary bodies being configured to interpose the fiber sheet between the parallel rotation axes,
wherein the rotary body, includes:
a first rotary member configured to rotate and come into contact with an upper surface of the fiber sheet; and
a second rotary member that is spaced away from the first rotary member, and configured to rotate and come into contact with a lower surface of the fiber sheet, and
wherein the first rotary member has a same rotation axis as the second rotary member.

2. The fiber sheet width adjusting apparatus according to claim 1, further comprising an elastic member configured to vary an interval between the first rotary member and the second rotary member on a basis of a thickness of the fiber sheet.

3. The fiber sheet width adjusting apparatus according to claim 1, wherein the respective rotation axes of the two rotary bodies are disposed on opposing sides of a width of the fiber sheet.

4. The fiber sheet width adjusting apparatus according to claim 1, wherein, in the direction perpendicular to the feed direction, the respective rotation axes of the two rotary bodies are disposed on opposing sides of the fiber sheet.

5. The fiber sheet width adjusting apparatus according to claim 1, wherein, in the feed direction, the fiber sheet is fed between the two rotary bodies.

6. The fiber sheet width adjusting apparatus according to claim 5, wherein, in the feed direction, the fiber sheet exits the fiber sheet width adjusting apparatus from an area located between the two rotary bodies.

7. The fiber sheet width adjusting apparatus according to claim 1, wherein, in the thickness direction of the fiber sheet, an area of the first rotary member that contacts with the upper surface of the fiber sheet overlaps with an area of the second rotary member that contacts with the lower surface of the fiber sheet.

8. A fiber sheet width adjusting method, comprising:
manufacturing, with the fiber sheet width adjusting apparatus according to claim the fiber sheet in which the width and the orientation angle are varied.

9. The fiber sheet width adjusting method according to claim 8, further comprising:
cutting a part of the fiber sheet to thereby manufacture the fiber sheet having the width that becomes smaller with decreasing distance toward an end of the fiber sheet, the part of the fiber sheet being broadened after becoming narrow in the width as a result of receiving, by the rotary body, the force containing the component that is in the direction perpendicular to the thickness direction and to the feed direction.

10. A composite forming method, comprising
manufacturing a composite, the manufacturing of the composite including:
curing, by heating, a resin impregnated in the fiber sheet manufactured by the fiber sheet width adjusting method according to claim 8.

11. A composite forming method, comprising:
stacking the fiber sheet manufactured by the fiber sheet width adjusting method according to claim 8; and
manufacturing a composite, the manufacturing of the composite including curing, by heating, a resin impregnated in the fiber sheet stacked by the stacking the fiber sheet.

12. A fiber sheet width adjusting apparatus, comprising:
a rotary body configured to rotate around a rotation axis while interposing a fiber sheet, and to cause, by a frictional three generated between the rotary body and the fiber sheet, a force to act on the fiber sheet while feeding the fiber sheet in a feed direction to vary a width and an orientation angle of the fiber sheet, the rotation axis being parallel to a thickness direction of the fiber sheet,
wherein the rotary body includes:
a first rotary member configured to rotate and come into contact with an upper surface of the fiber sheet; and
a second rotary member that is spaced away from the first rotary member, and configured to rotate and come into contact with a bottom surface of the fiber sheet, and
wherein, in the thickness direction of the fiber sheet, an area of the first rotary member that contacts with the upper surface of the fiber sheet overlaps with an area of the second rotary member that contacts with the bottom surface of the fiber sheet.

13. The fiber sheet width adjusting apparatus according to claim 12, wherein the rotary body comprises two rotary bodies that are disposed such that respective rotation axes of the two rotary bodies are parallel to each other to interpose the fiber sheet between the parallel rotation axes.

14. A fiber sheet width adjusting method, comprising:
interposing, with a rotary body, a fiber sheet that is impregnated with a resin or before the impregnation with the resin, the rotary body being configured to rotate around a rotation axis that is parallel to a thickness direction of the fiber sheet; and
manufacturing the fiber sheet in which a width and an orientation angle of the fiber sheet are varied, the manufacturing the fiber sheet including:
rotating the rotary body; and causing, with the rotating of the rotary body, a force to act on the fiber sheet while feeding the fiber sheet in a feed direction, by a frictional force generated between the rotary body and the fiber sheet, the force containing a component that is in a direction perpendicular to the thickness direction and to the feed direction, wherein the rotary body comprises two rotary bodies that are disposed with respective rotation axes of the two rotary bodies being parallel to each other, wherein the interposing comprises passing the fiber sheet between the respective rotation axes, wherein the rotary body includes:
- a first rotary member configured to rotate and come into contact with an upper surface of the fiber sheet; and
- a second rotary member that is spaced away from the first rotary member, and configured to rotate and come into contact with a lower surface of the fiber sheet, and wherein the first rotary member has a same rotation axis as the second rotary member.

15. The fiber sheet width adjusting method according to claim 14, wherein the first rotary member and the second rotary member form a pair of disk-shaped rollers each including a circular projection, wherein the rotating the rotary body comprises rotating the pair of disk-shaped rollers, and wherein the causing the force to act comprises causing, with the rotating of the pair of disk-shaped rollers, the force to act on the fiber sheet while feeding the fiber sheet in the feed direction, by the frictional force generated between the projections of the respective rollers and the fiber sheet.

16. The fiber sheet width adjusting method according to claim 14, wherein each of the first rotary member and the second rotary member includes a projection that follows a curve, wherein the rotating the rotary body comprises rotating the first rotary member and the second rotary member, and wherein the causing the force to act comprises causing, with the rotating of the first rotary member and the second rotary member, the force to act on the fiber sheet while feeding the fiber sheet in the feed direction, by the frictional force generated between the projections of the respective rotary members and the fiber sheet.

17. The fiber sheet width adjusting method according to claim 14, further comprising:

heating, with a heater, the fiber sheet that includes a thermoplastic binder, before the interposing the fiber sheet.

* * * * *